US012756828B2

(12) United States Patent
Lim et al.

(10) Patent No.: US 12,756,828 B2
(45) **Date of Patent: *Oct. 6, 2026**

(54) VIDEO ENCODING AND DECODING METHODS AND DEVICE USING SAME

(71) Applicant: Electronics and Telecommunications Research Institute, Daejeon (KR)

(72) Inventors: Sung Chang Lim, Daejeon (KR); Hui Yong Kim, Daejeon (KR); Jin Ho Lee, Daejeon (KR); Jin Soo Choi, Daejeon (KR); Jin Woong Kim, Daejeon (KR); Jae Gon Kim, Goyang-si (KR); Sang Yong Lee, Goyang-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/021,095

(22) Filed: Jan. 14, 2025

(65) Prior Publication Data

US 2025/0159158 A1 May 15, 2025

Related U.S. Application Data

(63) Continuation of application No. 18/311,786, filed on May 3, 2023, now Pat. No. 12,231,635, which is a (Continued)

(30) Foreign Application Priority Data

Jul. 1, 2011 (KR) ........................ 10-2011-0065431
Aug. 18, 2011 (KR) ........................ 10-2011-0082462
Jul. 2, 2012 (KR) ........................ 10-2012-0071620

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/132* (2014.11);
(Continued)

(58) Field of Classification Search
CPC .. H04N 19/119; H04N 19/105; H04N 19/132; H04N 19/157; H04N 19/176;
(Continued)

(56) References Cited

U.S. PATENT DOCUMENTS 9,451,277 B2 * 9/2016 Wang .................. H04N 19/109
2012/0008676 A1 1/2012 Lee et al.
(Continued)

FOREIGN PATENT DOCUMENTS

KR 20090075767 A 7/2009
KR 20110017721 A 2/2011
(Continued)

OTHER PUBLICATIONS

International Search Report for Application No. PCT/KR2012/005251 dated Jan. 2, 2013 (5 pages including English translation).
(Continued)

*Primary Examiner* — Maria E Vazquez Colon
(74) *Attorney, Agent, or Firm* — Michael Best & Friedrich LLP

(57) ABSTRACT

The present invention relates to video encoding/decoding methods and device, wherein the video encoding method according to the invention comprises the following steps: acquiring information of peripheral blocks; setting the information about a current block based on the information of the peripheral blocks; and encoding the current block based on the set information, wherein the current block and the peripheral blocks may be a CU (coding unit).

3 Claims, 9 Drawing Sheets

Related U.S. Application Data continuation of application No. 17/510,560, filed on Oct. 26, 2021, now Pat. No. 11,677,942, which is a continuation of application No. 16/877,807, filed on May 19, 2020, now Pat. No. 11,190,767, which is a continuation of application No. 16/263,314, filed on Jan. 31, 2019, now Pat. No. 10,681,349, which is a continuation of application No. 15/806,574, filed on Nov. 8, 2017, now Pat. No. 10,250,880, which is a continuation of application No. 15/060,051, filed on Mar. 3, 2016, now Pat. No. 9,843,803, which is a continuation of application No. 14/130,071, filed as application No. PCT/KR2012/005251 on Jul. 2, 2012, now abandoned.

(51) Int. Cl.

| | |
|---|---|
| ***H04N 19/132*** | (2014.01) |
| ***H04N 19/157*** | (2014.01) |
| ***H04N 19/176*** | (2014.01) |
| ***H04N 19/196*** | (2014.01) |
| ***H04N 19/593*** | (2014.01) |
| ***H04N 19/70*** | (2014.01) |
| ***H04N 19/91*** | (2014.01) |
| *H04N 19/147* | (2014.01) |

(52) U.S. Cl.
CPC ......... *H04N 19/157* (2014.11); *H04N 19/176* (2014.11); *H04N 19/196* (2014.11); *H04N 19/593* (2014.11); *H04N 19/70* (2014.11); *H04N 19/91* (2014.11); *H04N 19/147* (2014.11)

(58) Field of Classification Search
CPC .... H04N 19/196; H04N 19/593; H04N 19/70; H04N 19/91; H04N 19/147; H04N 19/52
See application file for complete search history.

(56) References Cited

U.S. PATENT DOCUMENTS

| | | | |
|---|---|---|---|
| 2012/0189062 | A1 | 7/2012 | Sugio et al. |
| 2012/0243609 | A1 | 9/2012 | Zheng et al. |
| 2013/0022117 | A1 | 1/2013 | Lou et al. |
| 2013/0077689 | A1 | 3/2013 | Lim et al. |
| 2013/0107959 | A1 | 5/2013 | Park et al. |
| 2013/0156335 | A1 | 6/2013 | Lim et al. |
| 2013/0230103 | A1 | 9/2013 | Lim et al. |
| 2014/0140411 | A1 | 5/2014 | Alshina et al. |

FOREIGN PATENT DOCUMENTS

| | | | |
|---|---|---|---|
| KR | 20110018189 | A | 2/2011 |
| KR | 20110073263 | A | 6/2011 |
| WO | 2012/045886 | A1 | 4/2012 |

OTHER PUBLICATIONS

Bross et al., "High efficiency video coding (HEVC) text specification: draft 7", ITU-T SG16 WP3 and ISO/IEC JCT1/SC29/WG11 Doc. JCTJC-11003_d5 (2012), 277 pages.

Zhou, "Parallelized merge/skip mode for HEVC," ITU-T SG16 WP3 and ISO/IEC JTC1/SC29/WG11 Doc. JCTVC-F069, 6th Meeting: Torino, IT, Jul. 14-22, 2011 (13 pages).

Wiegand et al., "WD3: Working Draft 3 of High-Efficiency Video Coding," ITU-T SG16 WP3 and ISO/IEC JTC1/SC29/WG11 Doc. JCTVC-E603, 5th Meeting: Geneva, CH, Mar. 16-23, 2011 (239 pages).

* cited by examiner

VIDEO ENCODING AND DECODING METHODS AND DEVICE USING SAME

CROSS-REFERENCE TO RELATED APPLICATIONS

This application is a Continuation Application of U.S. patent application Ser. No. 18/311,786, filed May 3, 2023, which is a Continuation Application of U.S. patent application Ser. No. 17/510,560, filed Oct. 26, 2021, now U.S. Pat. No. 11,677,942, which is a continuation of U.S. patent application Ser. No. 16/877,807, filed on May 19, 2020, now U.S. Pat. No. 11,190,767, which is a Continuation Application of U.S. patent application Ser. No. 16/263,314, filed on Jan. 31, 2019, now U.S. Pat. No. 10,681,349, issued on Jun. 9, 2020, which is a Continuation Application of U.S. patent application Ser. No. 15/806,574, filed on Nov. 8, 2017, now U.S. Pat. No. 10,250,880, issued on Apr. 2, 2019, which is a Continuation Application of U.S. patent application Ser. No. 15/060,051, filed on Mar. 3, 2016, now U.S. Pat. No. 9,843,803, issued on Dec. 12, 2017, which is a Continuation Application of U.S. patent application Ser. No. 14/130,071 having a 371(c) date of Dec. 30, 2013, now abandoned, which is a U.S. national stage application of International Application No. PCT/KR2012/005251 filed on Jul. 2, 2012, which claims the benefit of Korean Patent Application No. 10-2011-0065431 filed on Jul. 1, 2011, Korean Patent Application No. 10-2011-0082462, filed on Aug. 18, 2011, and Korean Patent Application No. 10-2012-0071620, filed on Jul. 2, 2012, in the Korean Intellectual Property Office, the entire disclosures of which are incorporated herein by reference for all purposes.

TECHNICAL FIELD

The present invention relates to a video encoding/decoding technology, and more particularly, to a method and apparatus for encoding/decoding a current coding unit (CU) using surrounding CUS.

BACKGROUND ART

With the recent establishment of multimedia environment, various terminals and networks have been used and user demands have been diversified.

For example, as the performance and computing ability of a terminal are diversified, the terminal supports various performances. Furthermore, networks for transmitting information are also diversified according to external structures such as wired and wireless networks, types of transmitted information, information quantity, speed, etc. A user selects a terminal and a network according to a desired function, and the spectrum of terminals and networks, provided by companies to users, is extended.

As a high definition (HD) broadcast service is extended not only domestically but also globally, many users become accustomed to videos having high resolution and high definition. Accordingly, video service related organizations accelerate development of next-generation video apparatuses.

Furthermore, an increasing attention to ultra high definition (UHD) more than four times HD requires a compression technique for video having higher resolution and higher picture quality.

To compress and process video, inter prediction for predicting pixel values included in a current picture from a picture temporally before and/or after the current picture, intra prediction for predicting the pixel values included in the current picture using information on pixels in the current picture, entropy coding for allocating a short code to a symbol of high frequency and allocating a long code to a symbol of low frequency, etc. can be used.

As demands for HD video service increase, a method of using information of neighboring blocks is needed to appropriately control or minimize the quantity of transmitted information or the quantity of processed information.

SUMMARY OF INVENTION

Technical Problem

An object of the present invention is to provide a method and apparatus for encoding/decoding a current largest coding unit (LCU) using information of neighboring LCUs.

Another object of the present invention is to provide a method and apparatus for encoding/decoding a higher layer of the current LCU using coding information of a lower layer or cost. In the case of encoding using inter prediction, the present invention can limit the number of reference picture candidates of prediction units (PUs) belonging to a upper depth CU using encoding cost of a lower depth CU.

Technical Solution

According to one aspect of the present invention, a video encoding method includes obtaining information about neighboring blocks, configuring information about a current block on the basis of the information about the neighboring blocks, and encoding the current block on the basis of the configured information, wherein the current block and the neighboring blocks are coding units (CUs).

When the current block is a current largest coding unit (LCU) corresponding a coding target and the neighboring blocks are neighboring LCUs of the current LCU, in the configuring of the information about the current block, information to be used as information about the current LCU may be selected from coding information about the neighboring LCUs. The coding information may be a maximum coding depth, and in the configuring of the information about the current block, a maximum coding depth of the current LCU may be set on the basis of the largest value of maximum coding depths of the neighboring LCUs.

When the current block is a upper depth CU and the neighboring blocks are lower depth CUs, in the configuring of the information about the current block, reference pictures of the lower depth CUs may be set as reference pictures of the upper depth CU when a prediction direction of the lower depth CUs corresponds to a prediction direction of the upper depth CU.

When the current block is a higher depth CU and the neighboring blocks are lower depth CUs, in the configuring of the information about the current block, motion information about the current block may be derived using motion information about a neighboring block having a partition size and a partition position corresponding to the current block, from among the neighboring blocks.

According to another aspect of the present invention, a video decoding method includes obtaining information about neighboring blocks, deriving information about a current block on the basis of the information about the neighboring blocks, and decoding the current block on the basis of the configured information, wherein the current block and the neighboring blocks are CUs.

When the current block is a current LCU corresponding a coding target and the neighboring blocks are neighboring LCUs of the current LCU, in the deriving of the information about the current block, information to be used as information about the current LCU may be selected from coding information about the neighboring LCUs. The coding information may be a maximum coding depth and, in the deriving of the information about the current block, a maximum coding depth of the current LCU may be derived on the basis of the largest value of maximum coding depths of the neighboring LCUs.

When the current block is a higher depth CU and the neighboring blocks are lower depth CUs, in the deriving of the information about the current block, reference pictures of the lower depth CUs may be used as reference pictures of the higher depth CU when a prediction direction of the lower depth CUs corresponds to a prediction direction of the upper depth CU.

When the current block is a upper depth CU and the neighboring blocks are lower depth CUs, in the deriving of the information about the current block, motion information about the current block may be derived using motion information about a neighboring block having a partition size and a partition position corresponding to the current block, from among the neighboring blocks.

According to another aspect of the present invention, a video encoder includes a predictor for predicting information about a current block, a quantizer for quantizing the predicted information, and an entropy encoding unit for entropy-encoding the quantized information, wherein the predictor predicts the current block on the basis of information about neighboring blocks of the current block, and the current block and the neighboring blocks are CUs.

According to another aspect of the present invention, a video decoder includes a entropy decoding unit for entropy-decoding a received bit stream, a dequantizer for inversely quantizing the entropy-decoded information, and a predictor for predicting a current block on the basis of the inversely quantized information, wherein the predictor predicts the current block on the basis of information about neighboring blocks of the current block, and the current block and the neighboring blocks are CUs.

Advantageous Effects

The present invention can encode/decode the current LCU using information about neighboring LCUs so as to reduce complexity and increase coding efficiency.

In addition, the present invention can decrease complexity and increase coding efficiency by using coding information or cost of a lower layer when a higher layer of the current LCU is encoded/decoded.

MODE FOR INVENTION

The above and other aspects of the present invention will be described in detail through preferred embodiments with reference to the accompanying drawings. In the following description of the present invention, a detailed description of known functions and configurations incorporated herein will be omitted when it may obscure the subject matter of the present invention.

Figure 1:
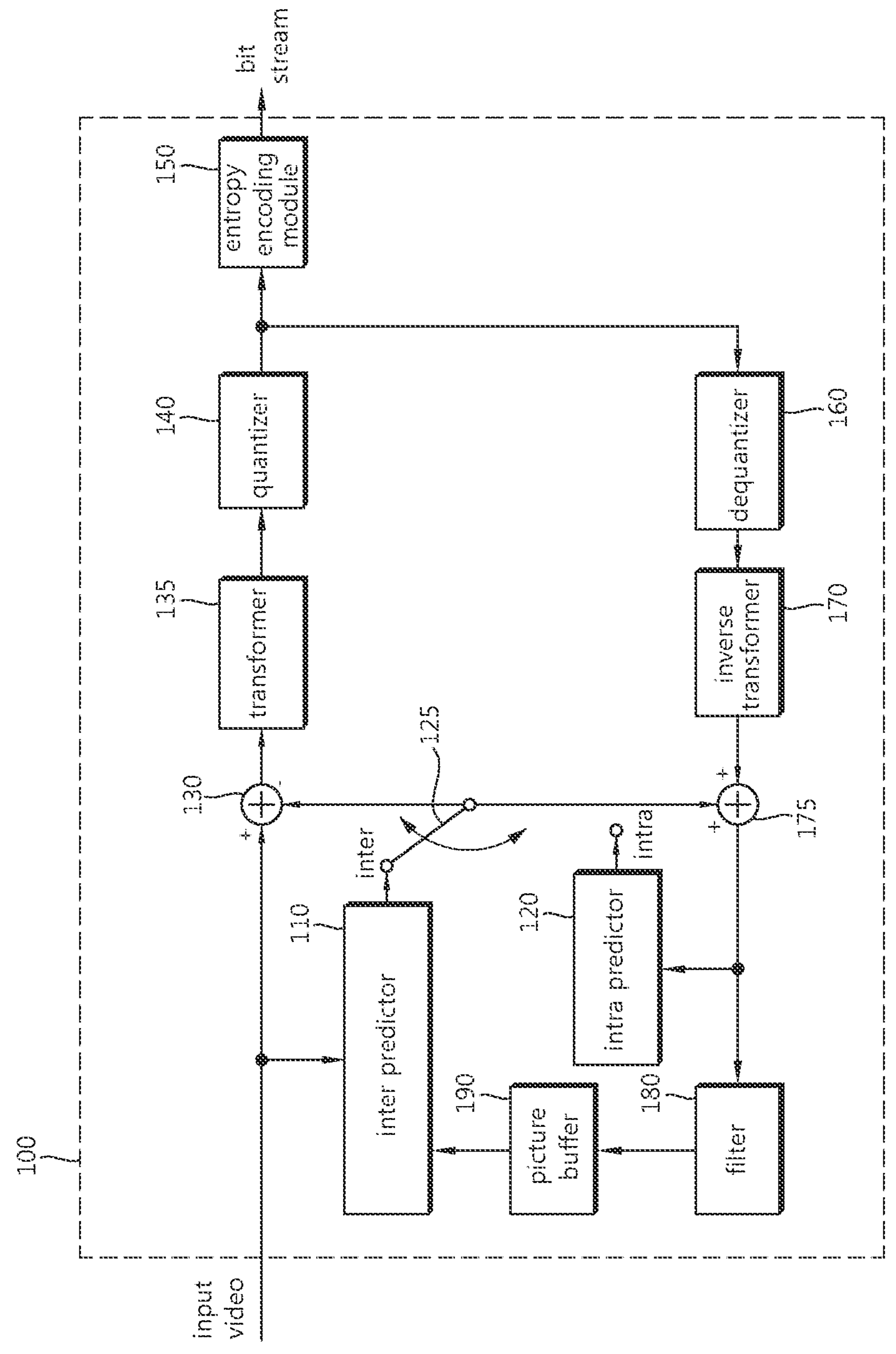
FIG. 1 is a block diagram illustrating a configuration of an encoder according to an embodiment of the present invention.

FIG. 1 is a block diagram illustrating a configuration of an encoder according to an embodiment of the present invention.

Referring to FIG. 1, the encoder 100 includes an inter predictor 110, an intra predictor 120, a switch 125, a subtractor 130, a transformer 135, a quantizer 140, an entropy encoding module 150, a dequantizer 160, an inverse transformer 170, an adder 175, a filter 180, and a picture buffer 190.

The encoder 100 may encode an input video in an intra mode or an inter mode and output a bit stream. The switch 125 is switched to the intra mode in the intra mode and switched to the inter mode in the inter mode. The encoder 100 may generate a prediction block for an input block of the input video, and then encode a difference between the input block and the prediction block.

In the intra mode, the intra predictor 120 may generate the prediction block by performing spatial prediction using pixel values of previously coded blocks adjacent to a current block.

In the inter mode, the inter predictor 120 may obtain a motion vector by detecting a region corresponding to the input block from reference pictures stored in the picture buffer 190 in a motion estimation procedure. The inter predictor 110 may generate the prediction block by performing motion compensation using the motion vector and the reference pictures stored in the picture buffer 190.

The subtractor 130 may generate a residual block using a difference between the input block and the generated prediction block. The transformer 135 may transform the residual block to output a transform coefficient. The quantizer 140 may quantize the transform coefficient input thereto according to a quantization parameter to output a quantized coefficient. The entropy encoding module 150 may entropy-encode the quantized coefficient according to probability distribution on the basis of values generated by the quantizer 140 or encoding parameters generated during an encoding process to output the bit stream.

The quantized coefficient may be inversely quantized by the dequantizer 160 and inversely transformed by the inverse transformer 170. The inversely quantized and inversely transformed coefficient may be added to the prediction block by the adder 175 to generate a reconstructed block.

The reconstructed block passes through the filter 180. The filter 180 may apply at least one of a deblocking filter, a sample adaptive offset (SAO), and an adaptive loop filter (ALF) to the reconstructed block or a reconstructed picture. The reconstructed block output from the filter 180 may be stored in the picture buffer 190.

Figure 2:
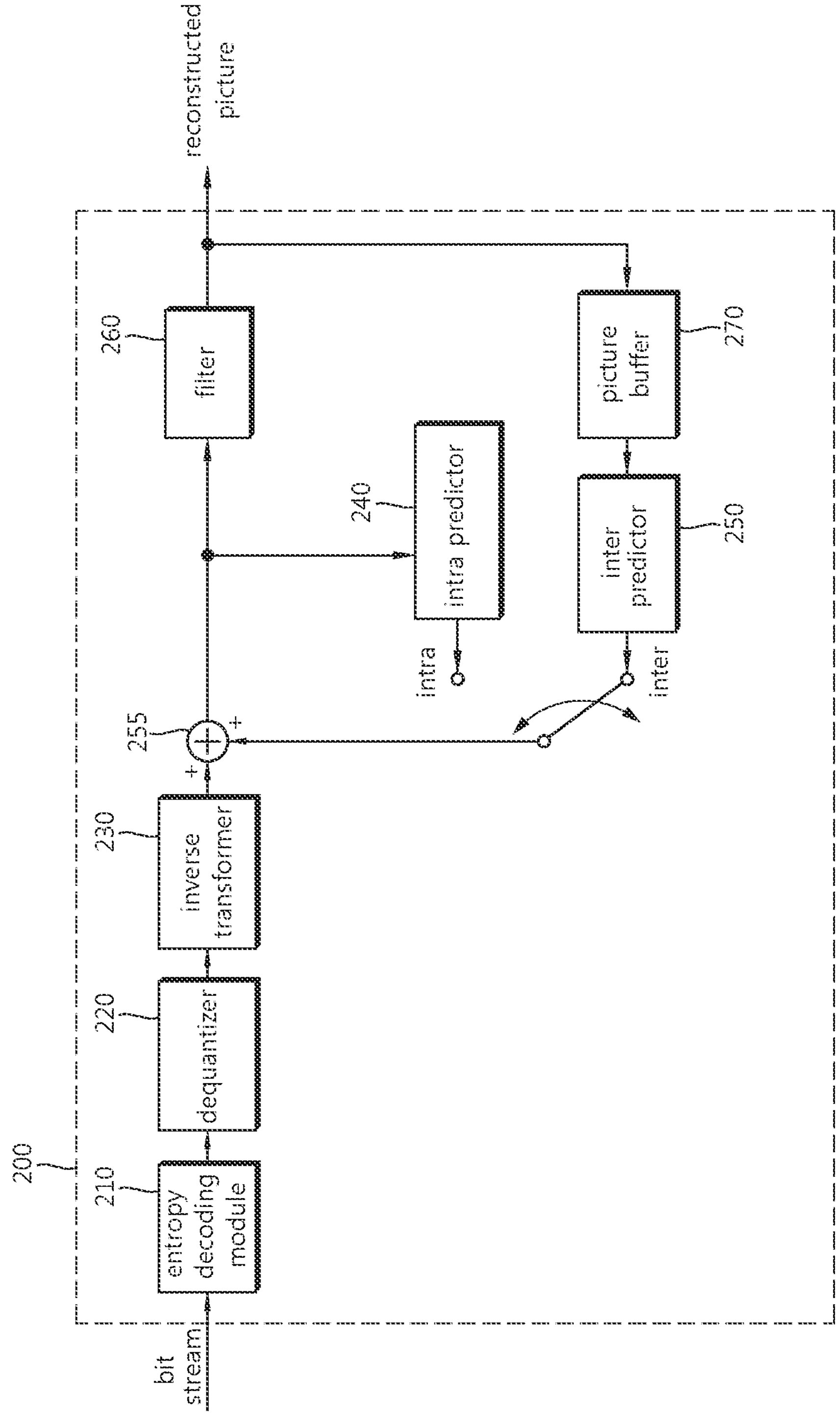
FIG. 2 is a block diagram illustrating a configuration of a decoder according to an embodiment of the present invention.

FIG. 2 is a block diagram illustrating a configuration of a decoder according to an embodiment of the present invention.

Referring to FIG. 2, the decoder 200 may include an entropy decoding module 210, a dequantizer 220, an inverse transformer 230, an intra predictor 240, an inter predictor 250, a filter 260, a picture buffer 270.

The decoder 200 may receive a bit stream output from an encoder and decode the bit stream in the intra mode or inter mode to output a reconfigured picture, that is, a reconstructed picture. A switch included in the decoder 200 is switched to the intra mode in the intra mode and switched to the inter mode in the inter mode.

The decoder 200 may obtain a reconstructed residual block from the received bit stream, generate a prediction block and sum the reconstructed residual block and the prediction block to generate a reconfigured block, that is, a reconstructed block.

The entropy decoding module 210 may entropy-decode the input bit stream according to probability distribution. Through entropy decoding, a quantized (transform) coefficient may be generated.

The quantized coefficient may be inversely quantized by the dequantizer 220 and inversely transformed by the inverse transformer 230, and thus a reconstructed residual block may be generated.

In the intra mode, the intra predictor 240 may generate a prediction block by performing spatial prediction using pixel values of previously decoded blocks around a current block. In the inter mode, the inter predictor 250 may generate the prediction block by performing motion compensation using a motion vector and reference pictures stored in the picture buffer 270.

The reconstructed residual block and the prediction block are summed by the adder 255. The summed block passes through the filter 260. The filter 260 may apply at least one of a deblocking filter, an SAO and an ALF to the reconstructed block or a reconstructed picture. The filter 260 may determine whether to use the ALF when the SAO is applied to the reconstructed block. The filter 260 outputs the reconfigured picture, that is, reconstructed picture. The reconstructed picture may be stored in the picture buffer 270 and used for inter prediction.

A coding unit (CU), which is a hierarchical coding unit, is defined without using a macroblock having a fixed size, and encoding/decoding can be performed by variably setting the size of the CU.

It is possible to define the largest CU (LCU) and the smallest CU (SCU). For example, the LCU can be defined to have a size of 64×64 pixels and the SCU can be defined to have a size of 8×8 pixels. An image may be hierarchically encoded by defining CUs having various sizes between the LCU and the SCU.

Here, CUs of various sizes have depth information. If the depth of the LCU is 0 and the depth of the SCU is D, CUs having sizes between the LCU and the SCU have depths in the range of 0 to D.

An encoded bit stream may include split_coding_unit_flag for a CU of each size as information for signaling the CU size. The split_coding_unit_flag is information indicating whether a current CU is split into CUs of a smaller size, that is, CUs having a upper depth. Here, the current CU is a CU to be encoded or decoded.

In an encoding method according to an embodiment of the present invention, a current LCU may be encoded using coding information about neighboring LCUs. For example, a maximum coding depth of the current LCU can be predicted using maximum depth information of neighboring LCUs. Here, the current LCU is an LCU to be encoded or decoded.

In the current LCU, a higher layer CU may be encoded using information of a lower layer. Here, a lower layer represents an encoding/decoding target (e.g. CU, PU, pixel, etc.) having a lower depth whereas a higher layer represents an encoding/decoding target (e.g. CU, PU, pixel, etc.) having a upper depth.

In the specification, when the depth of the LCU is 0 and the depth of the SCU is D, as described above, a depth closer to the LCU is referred to as a lower depth and a depth closer to the SCU is referred to as a upper depth. For example, depth d is lower than depth d+1 ($0<d<D$). In coding using inter prediction, the number of reference picture candidates for a prediction unit (PU) belonging to a higher CU can be limited using coding information of a lower depth CU.

Since a CU may have various sizes and has a hierarchical coding structure, complexity of coding the CU increases while coding efficiency is high. For example, an encoder calculates costs of coding methods applicable to CUs of available sizes to determine an optimized CU size and coding method. In this case, high calculation complexity is required because it is necessary to consider all coding methods applicable to all available CU sizes.

Here, it is possible to reduce calculation complexity and increase coding efficiency by removing redundancy of the current LCU and neighboring LCUs. A method of using information about neighboring LCUs for the current LCU can be considered to be a method for removing redundancy of the current LCU and the neighboring LCUs.

Furthermore, redundancy in the current LCU can be removed to reduce complexity and increase coding efficiency by using information about a lower layer (lower depth) in the current LCU.

A description will be given of an encoding/decoding method according to an embodiment with reference to the detached drawings.

Figure 3:
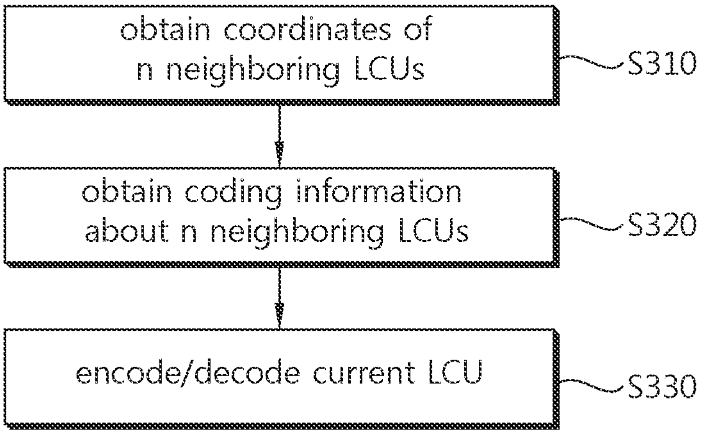
FIG. 3 is a flowchart illustrating an encoding/decoding method according to an embodiment of the present invention.

FIG. 3 is a flowchart illustrating an encoding/decoding method according to an embodiment of the present invention. FIG. 3 illustrates a method for encoding/decoding the current LCU using coding information of neighboring LCUs.

While the method illustrated in FIG. 3 may be performed in the individual modules included in the encoder and the decoder shown in FIGS. 1 and 2, the encoder and the decoder carry out operations of the modules in the following description for convenience of explanation.

Referring to FIG. 3, the encoder/decoder specifies locations of the neighboring LCUs of the current LCU (S310). For example, if the number of available LCUs located adjacent to the current LCU is n, the encoder/decoder obtains coordinates of the n neighboring LCUs. The coordinates specifying the locations of the neighboring LCUs may correspond to positions (x, y) of left-above pixels of the LCUs.

The encoder/decoder obtains coding information of the neighboring LCUs (S320). The encoder/decoder obtains coding information of the n neighboring LCUs specified in step S310. Here, the obtained coding information includes information about CU segmentation (split_coding_unit_flag), an LCU maximum depth (LCU_max_depth), an LCU spilt map (LCU_split_map), an LCU prediction type (LCU_Pred_Type), and an LCU partition size (LCU_Part_Size).

The LCU prediction type is information indicating whether an applied prediction type corresponds to inter prediction or intra prediction. The LCU prediction type may be information indicating which one of a skip mode, a merge mode and a method using MVP is used when inter prediction mode is applied and may be information indicating an intra prediction mode when intra prediction is applied. For example, the LCU prediction type may include skip_flag indicating application of the skip mode, ref_idx indicating a reference picture index, inter_pred_idc indicating an inter prediction method, mvp_idx indicating a motion vector predictor, merge_flag indicating whether the merge mode is applied, merge_idx indicating a merge target, prev_intra_luma_pred_flag indicating estimation of an intra prediction mode of a luma component from an intra prediction mode of a neighboring block, mpm_idx indicating a most frequently generated intra mode, intra_mode indicating an intra prediction mode, etc.

The LCU partition size is information representing an LCU partition form and may indicate whether LCU partition corresponds to 2N×2N, 2N×N or N×2N (N is the number of predetermined pixels).

The encoder/decoder encodes/decodes the current LCU on the basis of the coding information obtained from the neighboring LCUs (S330).

For example, the encoder/decoder can predict a maximum depth of the current LCU using depth information of the neighboring LCUs.

An LCU size may be fixed in a predetermined range. For example, an LCU can have sizes corresponding to 8×8 pixels, 16×16 pixels, 32×32 pixels and 64×64 pixels in the range of 8×8 pixels to 64×64 pixels. Furthermore, an LCU size may be variably determined such that it can be defined in a wider range. For example, an LCU size can be defined to correspond to 8×8 pixels, 16×16 pixels, 32×32 pixels, 64×64 pixels and 128×128 pixels in the range of 8×8 pixels to 128×128 pixels.

An LCU size and an SCU size used for encoding may be determined in the encoder and signaled to the decoder. For example, the SCU size can be signaled as log2_min_coding_block_size_minus3. The LCU size can be signaled as a difference between the LCU size and the SCU size, such as log2_diff_max_min_coding_block_size. When the difference between the LCU size and the SCU size is signaled to the decoder, the decoder may derive the LCU size using the received SCU size. The LCU size and the SCU size can be signaled through a sequence parameter set (SPS) by which coding information of a corresponding sequence is transmitted.

Figure 4:
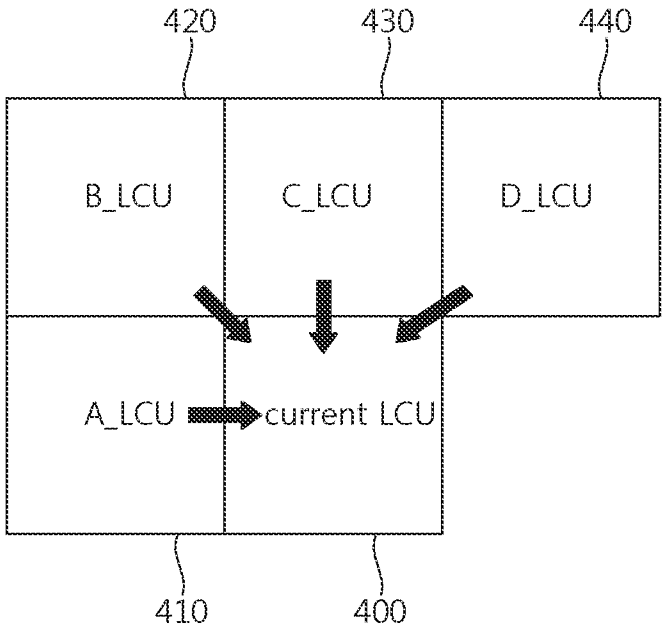
FIG. 4 illustrates a method for deriving coding information of a current LCU from coding information of neighboring LCUs according to an embodiment of the present invention.

FIG. 4 illustrates a method for deriving coding information of the current LCU from coding information of neighboring LCUs according to an embodiment of the present invention.

FIG. 4 shows a case in which four LCUs A_LCU, B_LCU, C_LCU and D_LCU 410, 420, 430 and 440 are located around the current LCU 400.

According to the present invention, the maximum coding depth of the current LCU can be predicted using maximum depth information of LCUs A_LCU, B_LCU, C_LCU and D_LCU 410, 420, 430 and 440.

Equation 1 represents an exemplary method of predicting the maximum coding depth of the current LCU using the neighboring LCUs A_LCU, B_LCU, C_LCU and D_LCU according to the present invention.

$$D=\min(3, \max(\text{A\_max\_depth}, \text{B\_max\_depth}, \text{C\_max\_depth}, \text{D\_max\_depth})+X) \quad \text{<Equation 1>}$$

In Equation 1, D denotes a maximum depth used for coding of the current LCU, X is information about the difference between the LCU size and the SCU size and corresponds to log2_diff_max_min_coding_block_size−1.

A_max_depth, B_max_depth, C_max_depth and D_max_depth respectively represent maximum depths of A_LCU, B_LCU, C_LCU and D_LCU.

For convenience of description, it is assumed that the LCU size corresponds to 64×64 pixels, the SCU size corresponds to pixels, prediction of N×N pixels is performed for the SCU only in inter prediction or intra prediction.

The encoder can determine an optimized CU size by performing rate distortion optimization (RDO) on CUs of sizes corresponding to depth 0 (64×64 pixels) to depth 3 (8×8 pixels).

Since the LCU size is 64×64 pixels and the SCU size is 8×8 pixels, as described above, a maximum depth max_depth of an LCU corresponds to a depth of a CU (SCU) having a size of 8×8 pixels, that is, depth 3.

Here, a maximum depth applicable to coding of the current LCU can be determined separately from the depth of the SCU. If the maximum depth applicable to coding of the current LCU is D, D can be determined as represented by Equation 2.

$$D=\min(3, \max(\text{A\_max\_depth}, \text{B\_max\_depth}, \text{C\_max\_depth}, \text{D\_max\_depth})+2) \quad \text{<Equation 2>}$$

When the depths of the four neighboring LCUs A_LCU, B_LCU, C_LCU and D_LCU are all 0, that is, when all the four neighboring LCUs are encoded to 64×64 pixels without being split, the maximum depth max_cu_depth of the current LCU, D, becomes 2 according to Equation 2. Accordingly, the encoder performs RDO on only CUs having sizes of 64×64 pixels, 32×32 pixels and 16×16 pixels and does not carry out RDO on a CU (SCU) having a size of 8×8 pixels.

While it is assumed that prediction of N×N pixels is performed on the SCU only, prediction of N×N pixels may be performed on only the smallest block to which RDO is applied. For example, when the maximum depth of the current LCU is 2 as described above, RDO is not performed on the CU having a size of 8×8 pixels although the SCU corresponds to the CU having a size of 8×8 pixels, and thus prediction of N×N pixels can be carried out on a block of a size corresponding to 16×16 pixels.

Alternatively, as an example of deriving the coding information of the current LCU using the coding information of the neighboring LCU, there is a method of deriving/estimating split information on the current LCU using split information on the neighboring LCU.

For example, the encoder/decoder can derive/estimate a split_coding_unit_flag value for the current LCU on the basis of a split_coding_unit_flag value corresponding to the split information about the neighboring LCUs. Here, when the split_coding_unit_flag value is 0, this indicates that a CU is not split any more. If the split_coding_unit_flag value is 1, this indicates that the CU is split into four sub CUs.

Referring to FIG. 4, the encoder/decoder may check split information split_coding_unit_flag about the neighboring LCUs A_LCU, B_LCU, C_LCU and D_LCU 410, 420, 430 and 440 before encoding/decoding the current LCU 400.

The encoder/decoder may set the split_coding_unit_flag value of the current LCU to 0 if all the checked split_coding_unit_flag values of the four neighboring LCUs are 0. Since the split_coding_unit_flag for the current LCU is not transmitted and can be derived from the neighboring LCUs, 1 bit used for transmission of the split_coding_unit_flag of the current LCU can be reduced. Furthermore, since the split_coding_unit_flag value of the current LCU is set to 0, complexity can be reduced unless a CU smaller than the current LCU is encoded.

The encoder/decoder can set the split_coding_unit_flag value of the current LCU to 1 if at least one of the checked split_coding_unit_flag values of the fourth neighboring LCUs is 1. Even in this case, the split_coding_unit_flag for the current LCU is not transmitted and can be derived from the neighboring LCUs, and thus 1 bit used for transmission of the split_coding_unit_flag of the current LCU can be reduced. In addition, since the split_coding_unit_flag value of the current LCU is set to 1, complexity can be reduced if only split CUs having a small size are encoded except the current LCU.

Consequently, split information split_coding_unit_flag may not be transmitted for each LCU at depth 0.

Table 1 shows an exemplary syntax when split information about the current LCU is derived using split information about neighboring LCUs.

TABLE 1

<table>
<tr><th></th><th>Descriptor</th></tr>
<tr><td>coding_tree( x0, y0, log2CUSize ) {<br>  if( x0 + ( 1 << log2CUSize ) <= PicWidthInSampls$_L$ &&<br>    y0 + ( 1 << log2CUSize ) <= PicHeightInSamples$_L$<br>    &&)<br>    if( !entropy_coding_mode_flag && slice_type != I )</td><td></td></tr>
<tr><td>      cu_split_pred_part_mode[ x0 ][ y0 ]</td><td>ce(v)</td></tr>
<tr><td>    else if(log2CUSize!=> Log2MaxCUSize &&<br>log2CUSize > Log2MinCUSize )</td><td></td></tr>
<tr><td>      split_coding_unit_flag[ x0 ][ y0 ]</td><td>u(1) | ae(v)</td></tr>
<tr><td>  if( adaptive_loop_filter_flag && alf_cu_control_flag ) {</td><td></td></tr>
</table>

TABLE 1-continued

<table>
<tr><th></th><th>Descriptor</th></tr>
<tr><td>    cuDepth = Log2MaxCUSize - log2CUSize<br>    if( cuDepth <= alf_cu_control_max_depth )<br>      if( cuDepth == alf_cu_control_max_depth ||<br>split_coding_unit_flag[ x0 ][ y0 ] == 0 )<br>        AlfCuFlagIdx++<br>  }</td><td></td></tr>
</table>

Table 1 shows a case in which an entropy encoding mode corresponds to context-based adaptive binary arithmetic coding (CABAC).

Referring to Table 1, the syntax of the current LCU can be adaptively entropy-coded according to coding information of the neighboring LCUs.

For example, if CABAC is used as an entropy coding method as shown in Table 1, a context index delta value of the syntax of the current LCU can be set based on syntax counting of the neighboring LCU.

Here, the context index depth value can be set according to Equation 3.

Context index=offset+increment+delta <Equation 3>

Examples of a context that can be set for the current LCU using Equation 3 include a merge index merge_idx, a motion vector predictor index mvp_idx, a remaining prediction mode rem_intra_luma_pred_mod except most probable mode (MPM) in the intra prediction mode, etc.

If the neighboring LCUs are encoded to an LCU size instead of being split, a most probable symbol (MPS) value may be set to 0 when split information split_coding_unit_flag about a CU having a depth lower than the maximum depth by 1, max_cu_depth-1, is encoded.

When context based adaptive variable length coding (CAVLC) is used as an entropy coding method, distinguished from Table 1, syntax counting of the neighboring LCUs may be reflected in an adaptive sorting table of the current LCU or used to select a variable length code table. That is, probability of the neighboring LCU syntax can be reflected in encoding/decoding of the current LCU using correlation between the coding information of the current LCU and the coding information of the neighboring LCUs.

For example, if the neighboring LCUs are encoded to an LCU size instead of being mode-split, a table that defines the split information about the CU having a depth lower than the maximum depth by 1, max_cu_depth-1, and prediction mode information can be modified from Table 2 to Table 3 and used.

TABLE 2

| cu_split_pred_part_mode | split_coding_unit_flag | merge_flag | PredMode | PartMode |
|---|---|---|---|---|
| 0 | 1 | — | — | — |
| 1 | 0 | — | MODE_SKIP | PART_2Nx2N |
| 2 | 0 | 1 | MODE_INTER | PART_2Nx2N |
| 3 | 0 | 0 | MODE_INTER | PART_2Nx2N |
| 4 | 0 | — | MODE_INTER | PART_2NxN |
| 5 | 0 | — | MODE_INTER | PART_Nx2N |
| 6 | 0 | — | MODE_INTRA | PART_2Nx2N |

TABLE 3

| cu_split_pred_part_mode | split_coding_unit_flag | merge_flag | PredMode | PartMode |
|---|---|---|---|---|
| 0 | 0 | — | MODE_SKIP | PART_2Nx2N |
| 1 | 0 | 1 | MODE_INTER | PART_2Nx2N |
| 2 | 0 | 0 | MODE_INTER | PART_2Nx2N |
| 3 | 0 | — | MODE_INTER | PART_2NxN |
| 4 | 0 | — | MODE_INTER | PART_Nx2N |
| 5 | 0 | — | MODE_INTRA | PART_2Nx2N |
| 6 | 1 | — | — | — |

Referring to Table 2 and Table 3, when the split_coding_unit_flag value is 1, cu_split_pred_part_mode that indicates partition and prediction modes may be adaptively allocated according to probabilities of generation of other modes.

In addition to the above-mentioned method for encoding/decoding the current LCU using information of neighboring LCUs, a method for encoding/decoding a upper depth CU using coding information of a lower depth CU of the current LCU can be considered as a method for encoding/decoding a current block using information about neighboring blocks.

Figure 5:
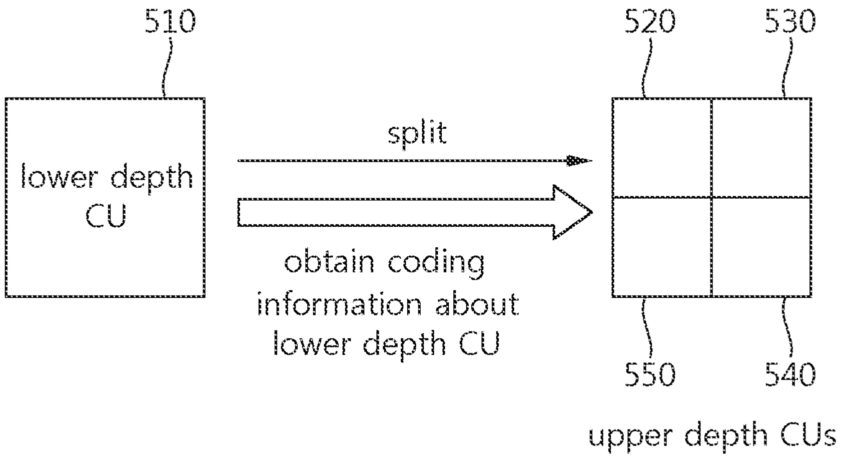
FIG. 5 illustrates a method for encoding/decoding a upper depth CU using coding information of a lower depth CU according to an embodiment of the present invention.

FIG. 5 illustrates a method for encoding/decoding a upper depth CU using coding information of a lower depth CU according to an embodiment of the present invention.

Referring to FIG. 5, when a lower depth CU 510 is split into four upper depth CUs 520, 530, 540 and 550, the upper depth CUs 520, 530, 540 and 550 can be encoded/decoded using coding information of the lower depth CU 510.

Figure 6:
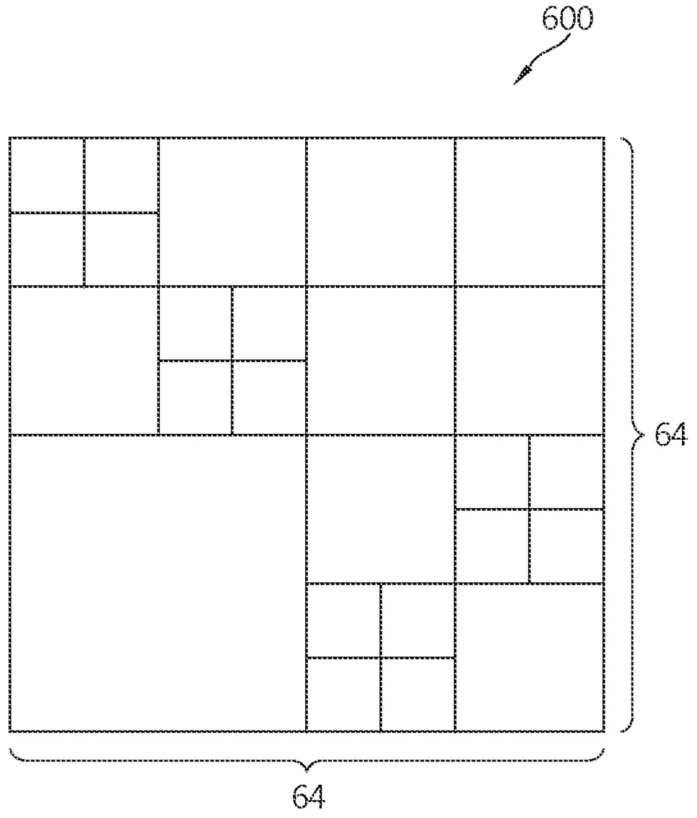
FIG. 6 illustrates an example of splitting a LCU.

FIG. 6 illustrates an example of splitting a LCU.

Referring to FIG. 6, an LCU 610 having a size of 64×64 pixels may be split into CUs of various sizes and encoded.

When the LCU is split into CUs of various sizes, while coding efficiency increases because encoding can be performed on each CU having an optimized size, complexity also increases. Specifically, the encoder determines optimized CU sizes and a PU coding mode for each CU size. To achieve this, the encoder needs to calculate rate-distortion cost for each coding mode applicable to each CU size, and thus high complexity is required. In this case, complexity can be considerably reduced using correlation between coding information of a lower depth CU and coding information of a upper depth CU, as described above.

Figure 7:
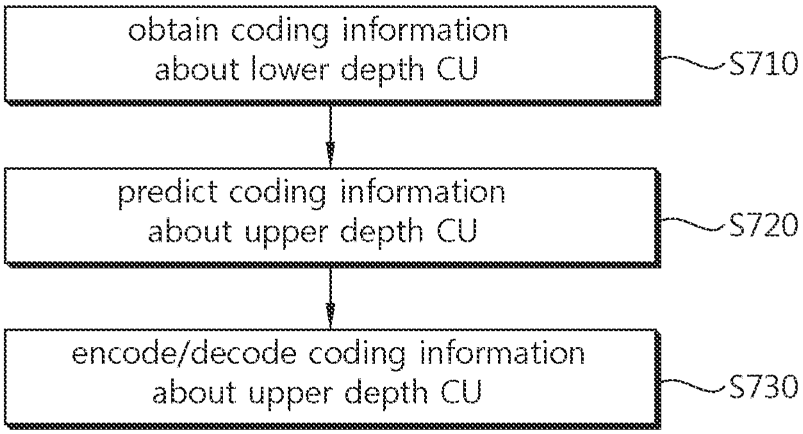
FIG. 7 is a flowchart illustrating an encoding/decoding method according to another embodiment of the present invention.

FIG. 7 is a flowchart illustrating an encoding/decoding method according to another embodiment of the present invention. FIG. 7 illustrates a method for encoding/decoding a higher layer of the current LCU using coding information of a lower layer.

While the method illustrated in FIG. 7 may be performed in the individual modules included in the encoder and the decoder shown in FIGS. 1 and 2, the encoder and the decoder carry out operations of the modules in the following description for convenience of explanation.

Referring to FIG. 7, the encoder/decoder obtains coding information about a lower depth CU of the current LCU (S710). When the encoder/decoder encodes/decodes a CU having a predetermined depth, the encoder/decoder can check and obtain coding information of an available lower depth CU.

Here, the obtained coding information includes information about split of the CU (split_coding_unit_flag), an LCU maximum depth (LCU_max_depth), an LCU split map (LCU_split_map), an LCU prediction type (LCU_Pred_Type), and an LCU partition size (LCU_Part_Size).

The LCU prediction type is information indicating whether an applied prediction type corresponds to inter prediction or intra prediction. The LCU prediction type may be information indicating which one of a skip mode, a merge mode and a method using MVP is used when inter prediction mode is applied and may be information indicating an intra prediction mode when intra prediction is applied. For example, the LCU prediction type may include skip_flag indicating application of the skip mode, ref_idx indicating a reference picture index, inter_pred_idc indicating an inter prediction method, mvp_idx indicating a motion vector predictor, merge_flag indicating whether the merge mode is applied, merge_idx indicating a merge target, prev_intra_luma_pred_flag indicating estimation of an intra prediction mode of a luma component from an intra prediction mode of a neighboring block, mpm_idx indicating a most frequently generated intra mode, intra_mode indicating an intra prediction mode, etc.

The LCU partition size is information representing an LCU partition form and may indicate whether LCU partition corresponds to 2N×2N, 2N×N or N×2N (N is the number of predetermined pixels).

The encoder/decoder predicts coding information of the upper depth CU on the basis of the obtained coding information of the lower depth CU (S720). For example, if a PU belonging to the upper depth CU is inter-predicted, reference picture information and/or a motion vector of the PU belonging to the upper depth CU can be predicted from the coding information of the lower depth CU.

The encoder/decoder can encode/decode the upper depth CU on the basis of the predicted coding information (S730).

The encoder/decoder may predict the coding information of the upper depth CU using the coding information of the lower depth CU. For example, the encoder/decoder can limit reference pictures used for prediction of a PU included in the upper depth CU to a specific range when encoding/decoding the upper depth CU using the coding information of the lower depth CU. It is possible to increase compression efficiency while reducing complexity by limiting used reference pictures to predetermined reference pictures.

Figure 8:
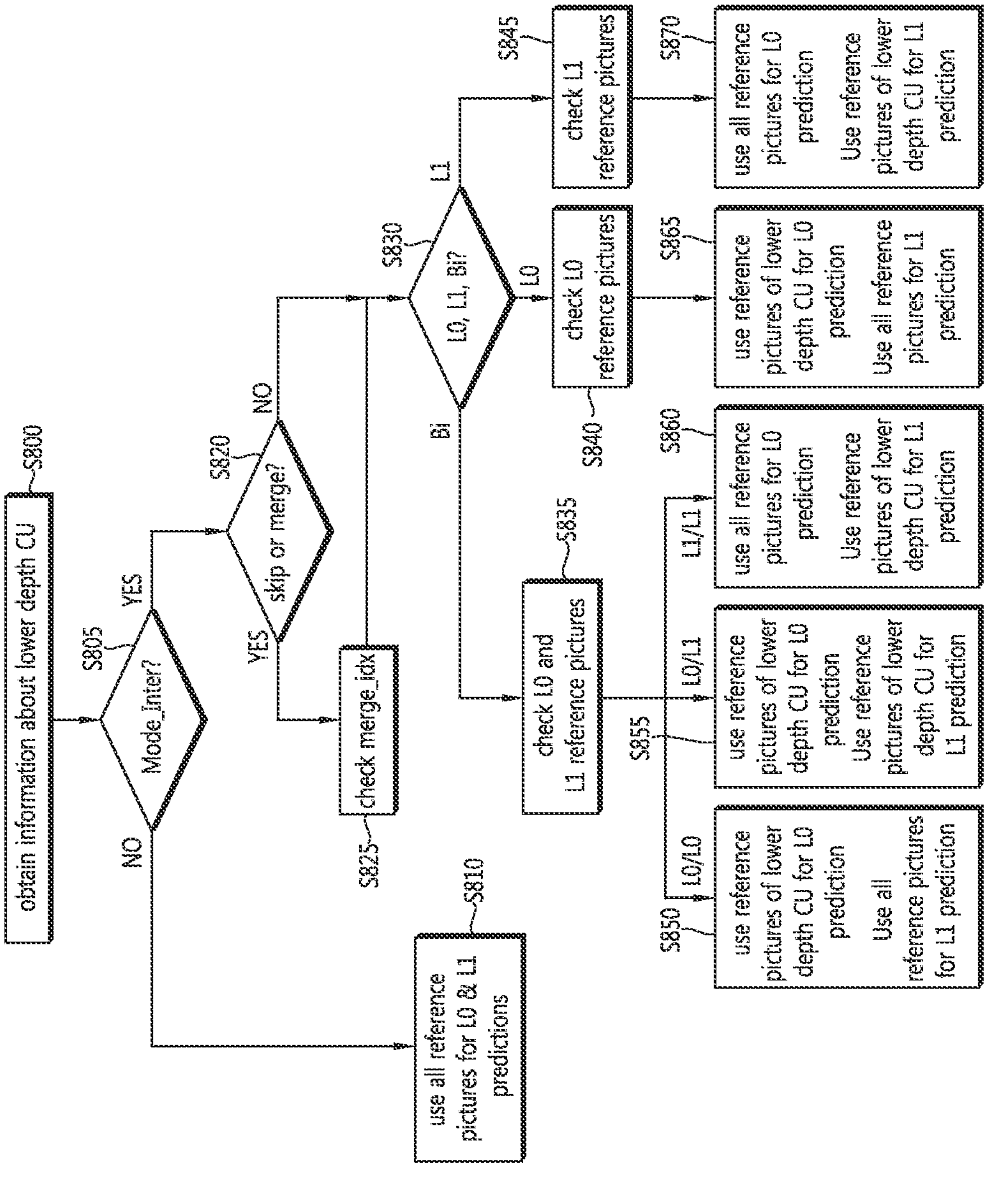
FIG. 8 is a flowchart illustrating a method for limiting reference pictures of a upper depth CU using coding information of a lower depth CU when the upper depth CU is encoded/decoded according to the present invention.

FIG. 8 is a flowchart illustrating a method for limiting reference pictures of a upper depth CU using coding information of a lower depth CU when the upper depth CU is encoded/decoded according to the present invention.

While the method illustrated in FIG. 8 may be performed by a predetermined module (e.g. inter predictor) included in the encoder/decoder shown in FIGS. 1 and 2, the encoder or the decoder (referred to as encoder/decoder) performs the method in the following description for convenience of explanation.

Referring to FIG. 8, the encoder/decoder obtains information about the lower depth CU (S800). For example, the encoder/decoder obtains information indicating whether the lower depth CU is inter-predicted or intra-predicted. Furthermore, the encoder/decoder may obtain information representing which one of a skip mode, a merge mode and MVP is used if the lower depth CU is inter-predicted and obtain information about an intra prediction mode if the lower depth CU is intra-predicted.

The encoder may signal the obtained information to the decoder, and the decoder may obtain the information by parsing a bit stream received from the encoder.

The encoder/decoder determines whether the lower depth CU is inter-predicted on the basis of the obtained information (S805).

If the lower depth CU is not inter-predicted (when the lower depth CU is intra-predicted), the encoder/decoder may inter-predict the upper depth CU which is the current block using all reference pictures for the upper depth CU in L0 and L1 predictions (S810). If the lower depth CU is inter-predicted, the encoder/decoder may determine whether the skip mode or the merge mode is applied to the lower depth CU (S820).

The encoder/decoder may check information such as a merge index when the skip mode or the merge mode is applied to the lower depth CU (S825). The merge index indicates motion information of a block, which is used as motion information of the current block when the skip mode or the merge mode is applied.

The encoder/decoder determines whether the lower depth CU is L0-predicted, L1-predicted, or bi-predicted (S830). When a CU is in the inter mode, motion compensation may be performed on a block by block basis. Motion compensation is carried out by applying forward prediction (L0 prediction) and backward prediction (L1 prediction) to each block. Here, L0 is reference picture list 0 and L1 is reference picture list 1.

Prediction applied to a target block may be divided into a case in which the target block is encoded using only one of L0 prediction and L1 prediction (uni-directional prediction) and a case in which the target block is encoded using both L0 prediction and L1 prediction (bi-prediction). A frame or a block that uses only one of L0 prediction and L1 prediction is referred to as a predictive frame (P frame) or a P block and a frame or a block that uses both L0 prediction and L1 prediction is referred to as a bi-predictive frame (B frame) or a B block.

When bi-prediction is applied to the lower depth CU, the encoder/decoder checks reference pictures of L0 and L1 (S835).

When L0 prediction is applied as uni-direction prediction to the lower depth CU, the encoder/decoder checks reference pictures of L0 (S840).

When L1 prediction is applied as uni-direction prediction to the lower depth CU, the encoder/decoder checks reference pictures of L1 (S845).

The encoder/decoder may restrict the reference pictures for the upper depth CU on the basis of the information checked in steps S835, S840 and S845.

That is, when the prediction direction of the higher depth CU corresponds to the prediction direction of the lower depth CU, it is possible to perform inter prediction of the higher depth CU using pictures corresponding to reference pictures of the lower depth CU from among reference picture candidates for the higher depth CU as reference pictures.

If the prediction direction of the upper depth CU is different from the prediction direction of the lower depth CU, it is possible to perform inter prediction of the upper depth CU using all reference picture candidates that belong to the prediction direction of the upper depth CU.

For example, if bi-prediction in L0 direction/L0 direction has been applied to the lower depth CU, a picture used as a reference picture for the lower depth CU, from among the reference picture candidates for the upper depth CU, is used as a reference picture when L0 prediction is performed on the upper depth CU which is a current block, whereas all the reference picture candidates for the upper depth CU are used when L1 prediction is performed on the upper depth CU (S850).

If bi-prediction in L0 direction/L1 direction has been applied to the lower depth CU, a picture used as a reference picture for L0 prediction of the lower depth CU, from among the reference picture candidates for the upper depth CU corresponding to the current block, is used as a reference picture when L0 prediction is performed on the upper depth CU which is a current block, whereas a picture used as a reference picture for L1 prediction of the lower depth CU, from among the reference picture candidates for the upper depth CU, is used as a reference picture when L1 prediction is performed on the upper depth CU (S855).

If bi-prediction in L1 direction/L1 direction has been applied to the lower depth CU, all the reference picture candidates for the upper depth CU are used when L0 prediction is performed on the upper depth CU which is a current block, whereas a picture used as a reference picture for the lower depth CU is used as a reference picture when L1 prediction is performed on the upper depth CU (S860).

If uni-directional prediction in L0 direction has been applied to the lower depth CU, a picture used as a reference picture for the lower depth CU, from among the reference picture candidates for the upper depth CU, is used as a reference picture when L0 prediction is performed on the upper depth CU which is a current block, whereas all the reference picture candidates for the upper depth CU are used when L1 prediction is performed on the upper depth CU (S865).

If uni-directional prediction in L1 direction has been applied to the lower depth CU, a picture used as a reference picture for the lower depth CU, from among the reference picture candidates for the upper depth CU, is used when L1 prediction is performed on the upper depth CU which is a current block, whereas all the reference picture candidates for the upper depth CU are used when L0 prediction is performed on the upper depth CU (S870).

When the skip mode or the merge mode is applied to the lower depth CU, if the merge index for the lower depth CU is checked in step S825, prediction can be performed using a merge candidate or a skip candidate of the upper depth CU, which is indicated by the merge index for the lower depth CU, as a skip candidate or a merge candidate for the upper depth CU in steps S850 to S870. Here, the skip candidate represents motion information used as motion information of the current block or a block having the motion information when the skip mode is applied. The merge candidate represents motion information used as motion information of the current block or a block having the motion information when the merge mode is applied.

Furthermore, when the skip mode or the merge mode is applied to the lower depth CU, prediction may be performed using the merge candidate or the skip candidate of the upper depth CU, which is indicated by the merge index of the lower depth CU, as the skip candidate or the merge candidate for the upper depth CU only when the prediction direction of the lower depth CU corresponds to the prediction direction of the upper depth CU in steps S850 to S870 on the basis of the merge index of the lower depth CU, confirmed in step S825.

To check (obtain) the coding information of the lower depth CU and use more correct information for the upper depth CU, it may be possible to perform prediction on a CU having an even-numbered depth (e.g. depth 0, depth 2) using only information on the corresponding depth in a normal method and to carry out prediction on a CU having an odd-numbered depth (e.g. depth 1, depth 3) using the coding information of the lower depth CU. That is, prediction of a CU of depth 1 can be performed using coding information about a CU of depth 0 and prediction of a CU of depth 3 can be carried out using coding information about a CU of depth 2.

Accordingly, it is possible to reduce the influence of propagation, caused by application of the coding information about the CU of depth 0 up to prediction of the CU of depth 3, and to increase prediction accuracy when the coding information about the lower depth CU is used for all depths.

It may be possible to use motion information of the lower depth CU corresponding to the upper depth CU when prediction of the upper depth CU is performed by checking a partition size or partition position of the lower depth CU.

Figure 9:
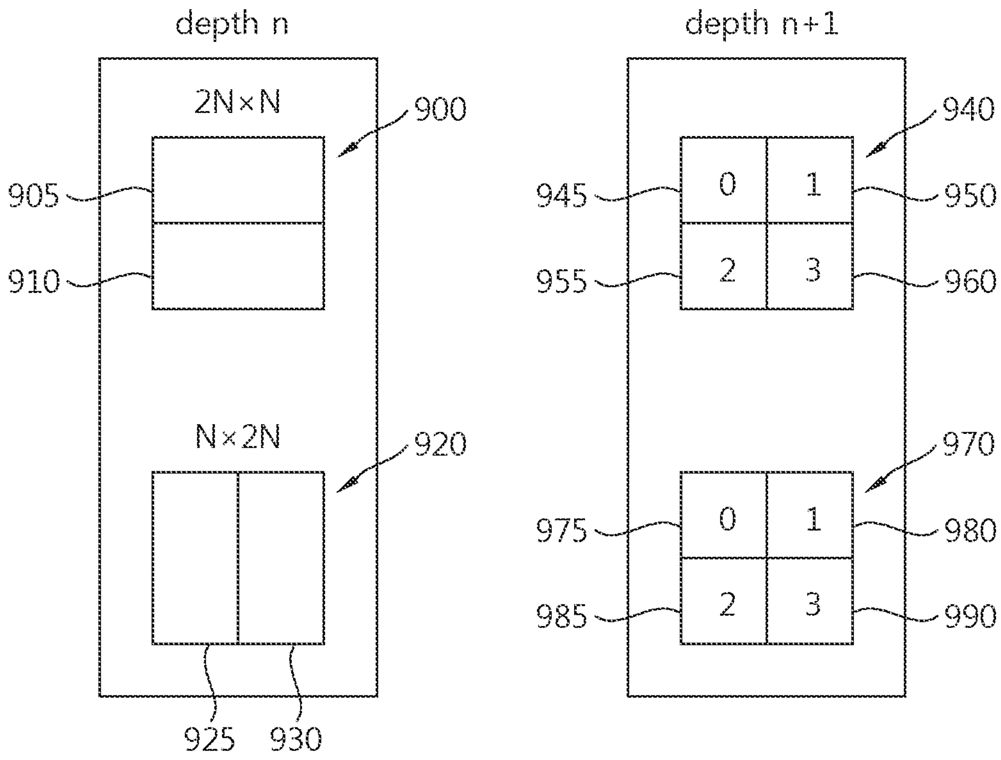
FIG. 9 illustrates a method of using a correspondence relationship between a upper depth CU and a lower depth CU when prediction is performed according to the present invention.

FIG. 9 illustrates a method of using correspondence between a upper depth CU and a lower depth CU when prediction is performed according to the present invention. FIG. 9 shows a case in which a partition size and a partition position are used as correspondence between the upper depth CU and the lower depth CU.

Referring to FIG. 9, if a partition size of lower depth CUs 900 having a depth of n is 2N×N, CUs 945 and 950 from among upper depth CUs 940 having a depth of n+1 may use motion information about a lower depth CU 905 corresponding thereto as motion information thereof or may derive the motion information thereof on the basis of the motion information about the lower depth CU 905. Otherwise, upper depth CUs 955 and 960 may use motion information about a lower depth CU 910 corresponding thereto as motion information thereof or may derive the motion information thereof on the basis of the motion information about the lower depth CU 910.

If a partition size of lower depth CUs 920 having a depth of n is N×2N, CUs 975 and 985 from among upper depth CUs 970 having a depth of n+1 may use motion information about a lower depth CU 925 corresponding thereto as motion information thereof or may derive the motion information thereof on the basis of the motion information about the lower depth CU 925. Otherwise, upper depth CUs 980 and 990 may use motion information about a lower depth CU 930 corresponding thereto as motion information thereof or may derive the motion information thereof on the basis of the motion information about the lower depth CU 930.

While a CU has been described as the unit of encoding/decoding, this is exemplary and the present invention is not limited thereto. For example, descriptions of FIGS. 3 to 9 may be equally applied to a PU and a TU instead of the CU.

Furthermore, while two embodiments (the embodiment of using coding information about neighboring LCUs, illustrated in FIGS. 3 and 4, and the embodiment of using information about a lower depth block, illustrated in FIGS. 5 to 9) have been separately described, this is for the purpose of clarifying description of the respective embodiments and the present invention is not limited thereto. For example, the two embodiments can be performed separately and carried out in a combined manner.

While the aforementioned exemplary methods have been described as steps or blocks on the basis of flowcharts in the above-described exemplary system, the present invention is not limited to the order of steps and some steps may be generated differently from the above steps or simultaneously. Furthermore, the above-mentioned embodiments include various illustrations of various aspects. Accordingly, a combination of the embodiments should be understood as an embodiment of the present invention.

The invention claimed is:

1. A method for performing an inter prediction, the method comprising:

determining whether merge mode is applied a current block;

deriving coding information in units of a coding block;

deriving motion information of the current block using the coding information; and performing an inter prediction on the current block based on the motion information, wherein the current block is any one of sub blocks divided from the coding block, wherein the coding information includes information related to merge mode, wherein, the information related to merge mode includes merge candidates, which are derived based on a position of the coding block, and wherein, when the coding block has a predefined size, the coding information is used for predicting motion information of the sub blocks divided from the coding block, wherein, when the coding block does not have the predefined size, merge candidates derived based on a position of each of the sub blocks are used for predicting motion information of the sub blocks, wherein the motion information is derived based on the coding information and an index related to the merge mode.

2. A method for encoding a video signal, the method comprising:

determining whether merge mode is applied a current block;

determining coding information in units of a coding block;

deriving motion information of the current block using the coding information; and performing an inter prediction on the current block based on the motion information, wherein the current block is any one of sub blocks divided from the coding block, wherein the coding information includes information related to merge mode, wherein, the information related to merge mode includes merge candidates, which are derived based on a position of the coding block, and wherein, when the coding block has a predefined size, the coding information is used for predicting motion information of the sub blocks divided from the coding block, wherein, when the coding block does not have the predefined size, merge candidates derived based on a position of each of the sub blocks are used for predicting motion information of the sub blocks, wherein the motion information is derived based on the coding information and an index related to the merge mode.

3. A method for storing a bitstream, the storing method comprising:

storing the bitstream into a non-transitory recording medium, wherein the non-transitory recording medium stores the bitstream generated by a method for encoding a video signal, the encoding method comprising:

determining whether merge mode is applied a current block;

determining coding information in units of a coding block;

deriving motion information of the current block using the coding information; and performing an inter prediction on the current block based on the motion information, wherein the current block is any one of sub blocks divided from the coding block, wherein the coding information includes information related to merge mode, wherein, the information related to merge mode includes merge candidates, which are derived based on a position of the coding block, and wherein, when the coding block has a predefined size, the coding information is used for predicting motion information of the sub blocks divided from the coding block, wherein, when the coding block does not have the predefined size, merge candidates derived based on a position of each of the sub blocks are used for predicting motion information of the sub blocks, wherein the motion information is derived based on the coding information and an index related to the merge mode.

* * * * *